(12) United States Patent
Huidekoper

(10) Patent No.: US 9,573,414 B2
(45) Date of Patent: Feb. 21, 2017

(54) VEHICLE WHEEL

(71) Applicant: Louis Huidekoper, London (GB)

(72) Inventor: Louis Huidekoper, London (GB)

( * ) Notice: Subject to any disclaimer, the term of this patent is extended or adjusted under 35 U.S.C. 154(b) by 0 days.

(21) Appl. No.: 14/428,834

(22) PCT Filed: Oct. 9, 2013

(86) PCT No.: PCT/NL2013/050715
§ 371 (c)(1),
(2) Date: Mar. 17, 2015

(87) PCT Pub. No.: WO2014/058313
PCT Pub. Date: Apr. 17, 2014

(65) Prior Publication Data
US 2015/0273934 A1    Oct. 1, 2015

(30) Foreign Application Priority Data

Oct. 9, 2012    (NL) ..................................... 2009595

(51) Int. Cl.
*B60B 3/04*    (2006.01)
*B60B 5/02*    (2006.01)
(Continued)

(52) U.S. Cl.
CPC ............... *B60B 3/044* (2013.01); *B60B 3/045* (2013.01); *B60B 3/10* (2013.01); *B60B 5/02* (2013.01);
(Continued)

(58) Field of Classification Search
CPC ............ B60B 3/044; B60B 3/10; B60B 3/045; B60B 5/02; B60B 25/002; B60B 23/10; B60B 2900/121
(Continued)

(56) References Cited

U.S. PATENT DOCUMENTS

| 4,643,484 A * | 2/1987 | Luter | ..................... B60B 23/12 |
| | | | 301/11.1 |
| 6,027,176 A * | 2/2000 | Kuhl | ..................... B60B 3/002 |
| | | | 301/11.1 |

(Continued)

FOREIGN PATENT DOCUMENTS

DE    202007012873 U1    1/2008
EP         0593496 A1    4/1994
(Continued)

OTHER PUBLICATIONS

International Search Report for PCT/NL2013/050715; Dec. 20, 2013; 11 pgs.

*Primary Examiner* — S. Joseph Morano
*Assistant Examiner* — Jean Charleston
(74) *Attorney, Agent, or Firm* — Gardner Groff; Greenwald & Villanueva, PC

(57) ABSTRACT

The invention is directed to a vehicle wheel (1) comprising a rim (2) for receiving a tire at its radially outer side (3) and provided with an edge along the circumferential of the rim at its radially inner side, a wheel hub connected to the rim via a support element, wherein the material of the rim and the support element are different, the support element provided with openings at its end facing the rim to receive a connecting element, the edge of the rim provided with openings in line with the openings of the support element and wherein the support element is connected to the rim via the connecting elements present in the openings in the edge and in the openings of the support element, wherein the opening in the edge is a radial elongated opening or is a indentation in the edge or the openings in the support element are radially elongated openings or indentations.

12 Claims, 11 Drawing Sheets

Figure 1:
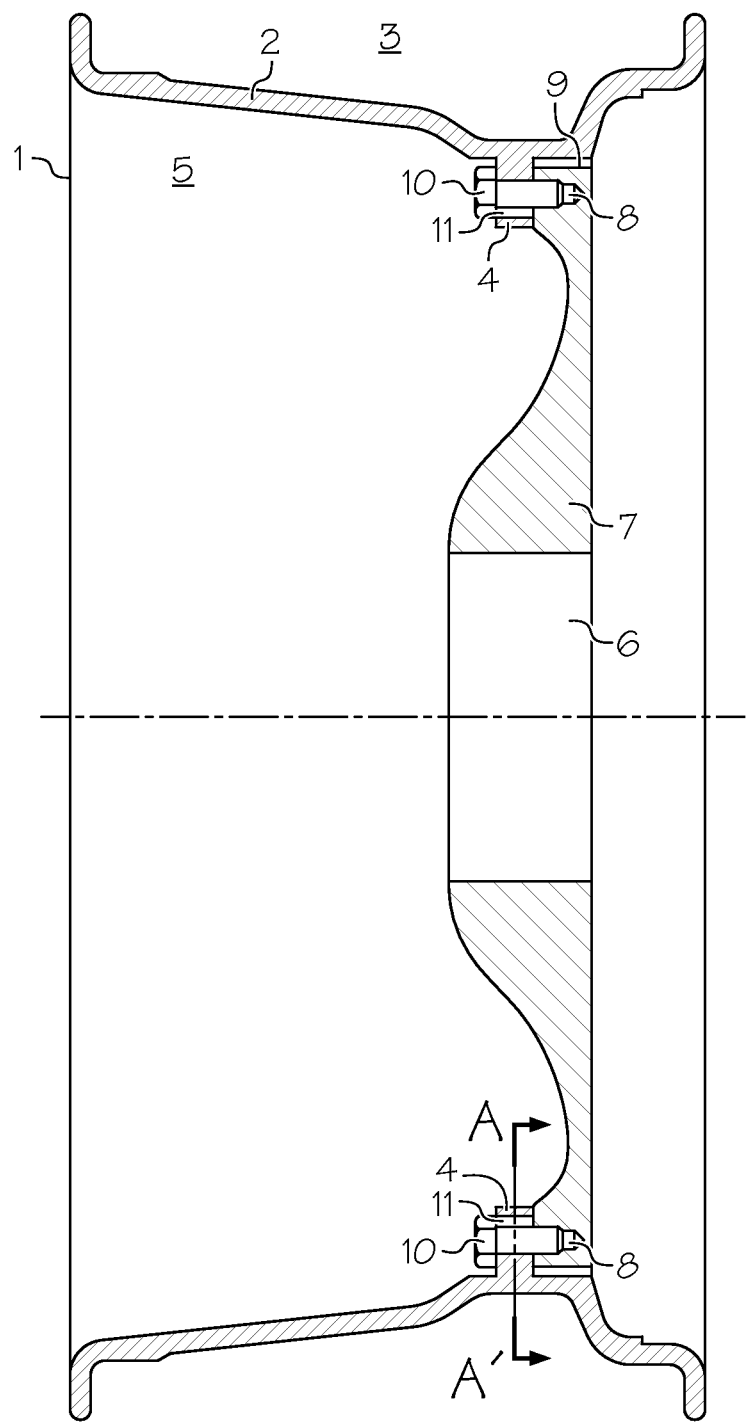

(51) Int. Cl.
*B60B 23/10* (2006.01)
*B60B 25/00* (2006.01)
*B60B 3/10* (2006.01)

(52) U.S. Cl.
CPC ............ *B60B 23/10* (2013.01); *B60B 25/002* (2013.01); *B60B 2310/305* (2013.01); *B60B 2310/306* (2013.01); *B60B 2360/10* (2013.01); *B60B 2360/341* (2013.01); *B60B 2360/3416* (2013.01); *B60B 2900/111* (2013.01); *B60B 2900/121* (2013.01); *B60B 2900/321* (2013.01); *B60B 2900/513* (2013.01); *B60Y 2200/11* (2013.01)

(58) Field of Classification Search
USPC ............... 301/10.1, 11.1, 105.1, 35.1, 35.62, 9.1,301/9.2
See application file for complete search history.

(56) References Cited

U.S. PATENT DOCUMENTS

| | | | |
|---|---|---|---|
| 6,921,138 B2* | 7/2005 | Smyth | B60B 3/005 |
| | | | 301/10.1 |
| 9,340,066 B2 | 5/2016 | Mueller et al. | |
| 2002/0017818 A1* | 2/2002 | Muller | B60B 3/002 |
| | | | 301/11.1 |
| 2009/0295218 A1* | 12/2009 | Putz | B60B 3/16 |
| | | | 301/11.1 |

FOREIGN PATENT DOCUMENTS

| | | |
|---|---|---|
| EP | 1022160 A2 | 7/2000 |
| EP | 1104707 A1 | 6/2001 |
| FR | 2425331 A2 | 12/1979 |
| GB | 454694 A | 10/1936 |

* cited by examiner

VEHICLE WHEEL

The invention is directed to a vehicle wheel comprising a rim for receiving a tire at its radially outer side and provided with an edge along the circumferential of the rim at its radially inner side. The wheel also comprises a wheel hub connected to the rim via a support element. The support element provided is with openings at its outer end or circumference facing the rim to receive connecting elements. The edge of the rim is provided with openings in line with the openings of the support element. The support element is connected to the rim via the connecting elements present in the openings in the edge and in the openings of the support element.

Such a wheel is described in EP-B-593496. This publication describes a wheel having a rim made of a high temperature plastic and a wheel disk made of aluminium, magnesium or, an aluminium or magnesium alloy. The wheel disk and rim are connected via openings present in an edge, number 7 in FIG. 1 of this publication. These openings align with openings present in the wheel disk to allow a screw connection between rim and wheel disk.

The design of the wheel as disclosed in EP-B-593496 is advantageous because the screw connection is not visible when the wheel is viewed from one side. This wheel design is suitable for cars. A disadvantage however is that it has been found difficult to fabricate such a wheel. Because the support element, the wheel disk according to EP-B-593496, and the rim are made of a different material, making alignment of the openings when assembling the screw connection potentially very cumbersome. First the openings in both support element and rim should be fabricated within very tight tolerances of each other in order to be able to make the connection using the connecting elements, i.e. the screws of EP-B-593496, which is extra difficult when the connection between the two main elements is made on one of the angled circular surface. Next, because the rim and the support element are made of different materials their thermal expansion can also be very different, as is for instance the case when the rim is made of a carbon reinforced plastic and the wheel centre from a steel, an aluminium, magnesium or a similar alloy. This means that the temperature at which the connections are made will be very critical. Fabrication at a different temperature than this optimal temperature will be difficult because of the resulting misalignment of the openings due to the use of the different materials.

Although the above problems can be resolved as explained a major disadvantage of the design of EP-B-593496 remains. In use the support element can heat up to very high temperatures resulting for example from the heat generated by using the brakes or simply from exposing the wheel assembly to the sun in a hot climate, where it may reach a very high temperature. As a result temperatures differences of 90° C. for such a metal support element are not uncommon. When the material of the support element and the rim are different the thermal expansion of the support element and rim will also be different. This can result in a high stress in the wheel assembly and ultimately to failure of the connection between rim and support element or the support elements itself or the wheel rim itself due to the increased stress and resulting fatigue over a period of otherwise normal use.

WO-A-2006/097856 describes a vehicle wheel having a rim made of carbon fibre reinforced epoxy resin and a metal support element, named spoke unit or wheel disk in this publication. The rim and support elements are connected via numerous threaded bolts, which extend through the base of the rim and are covered by the tire on one side and by the support element on its other side. This design has the same inherent disadvantages as the wheel described in EP-B-593496. Additionally special measures have to be taken to avoid air from escaping from the tire through the above described openings in the rim.

The present invention aims at providing a vehicle wheel wherein the connection between the support element and the rim will, in use, incur less stress and thus have a longer lifetime.

This is achieved by the following vehicle wheel. A vehicle wheel comprising a rim for receiving a tire at its radially outer side and provided with an edge along the circumference of the rim at its radially inner side, a wheel hub connected to the rim via a support element, the support element provided with three or more openings at its end facing the rim to receive a connecting element, the edge of the rim provided with three or more openings corresponding with the openings of the support element and wherein the support element is connected to the rim via the connecting elements present in the openings in the edge and in the openings of the support element, wherein the openings in the edge are radially elongated openings or radially elongated indentations in the edge or the openings in the support element are radially elongated openings or radially elongated indentations.

Applicants found that when the openings in the edge of the rim are radial elongated openings or when the openings are radially elongated indentations in the edge or wherein the openings in the support element are radially elongated openings less stress will result when the vehicle wheel is used in conditions of vastly varying temperatures. This results in that the wheel structure is and remains whole and effective in use throughout the wide temperature range and throughout its lifetime. The design of the openings in the edge allows for small movement of the connecting elements in the radial direction. This significantly results in much less stress as compared to the stress which would result when the design of EP-B-593496 is used in varying temperature conditions, because the resulting expansion or contraction of essentially circular components takes place radially. Additionally the openings can be manufactured with lower pitch circle diameter tolerances and placing the connecting elements is found to be easier when connecting the support element to the rim however temperature the components were manufactured at and whatever the temperature the components may be assembled at.

Because there are three or more radially elongated openings the wheel rim and the wheel hub support element will concentrically align perfectly as the radial degree of freedom in one of the holes will be countermanded by the orientation of the two or more other radially elongated holes will effectively limit this degree of freedom because the orientation of their elongation is every time at a different angle to the first hole and the next hole and so on for every hole however many radially elongated holes there are.

The material of the rim and of the support element may be the same. Because the temperature at the centre of the wheel may be higher than at the outer rim, causing differences in thermal expansion resulting in thermal stresses. This may even be the case when the material of rim and support element are the same. The advantages of the invention are especially pronounced when the materials of the rim and of the support element are different. By different is especially meant that the materials have a different thermal expansion.

Thus the invention is suitably directed to a vehicle wheel wherein the support element is made of a metal and the rim is made of another material. The other material may be a different metal, especially a metal having a different thermal expansion, or more preferably a fibre reinforced polymer. Such a metal and such a fibre reinforced polymer will typically have a different thermal expansion. The invention is especially directed to a vehicle wheel wherein the rim is made of a fibre reinforced polymer material and the support element is made of metal. The advantages of the present invention will be more significant for this combination or for a combination of two metals with very different thermal expansion properties. Examples of metal materials are steel, beryllium containing alloys, for example copper-beryllium alloys, beryllium oxide, aluminium, magnesium or an aluminium or magnesium alloy.

Examples of fibre reinforced polymers, are polymers reinforced with glass fibre, carbon fibre, nylon fibre, polyethylene fibre, for example Dynema and aramide type fibres, for example Kevlar or Twaron. Possible polymers may be thermoplastic or thermoset polymers. The thermoset polymer may be a polyester, a polyurethane or an epoxy resin. The thermoplastic polymer may be polyolefins, polyvinyl chloride, ethylene vinyl acetate, polymethylmethacrylate, polyamide or polyimide. An example of a suitable fibre reinforced polymer is a carbon fibre reinforced polymer. Preferably the polymer is a carbon fibre reinforced epoxy resin.

The fibres may be present as a woven matt, as unidirectional fibres or as a random strand matt. Alternatively the fibres may be injected together with the polymer when the rim is fabricated. The fibre reinforced polymer rim can be made using a mould and a vacuum moulding process, using high pressure in an autoclave, using a Resin-Transfer-Moulding (RTM) process, or using a resin injection moulding process or using a hand-lay-up processes or a combination of any of these processes. The openings in the edge or the indentations in the edge can be moulded or may be machined in a next step for ease of manufacture.

Examples of how the fibre reinforced polymer rim may be manufactured are described in U.S. Pat. No. 6,367,531, EP2363272, WO2009036736, EP1353788, EP2331348, WO2006/097856 and US20050104441. For example carbon fibre reinforced epoxy resin may be wrapped in tangential direction around the rim, so that a particularly high torque resistance of the rim is accomplished. Furthermore, it is also possible to use woven fibre materials and layups as a fibre component in the epoxy resin, which are manufactured through the typical weaving process, so that e.g. a diagonal layer of fibres, a perpendicular, or a parallel layout, or a joint array of various directions of fibres with reference to the tangential plane of the base of the rim is present. Depending on the selection of the orientation of the fibres, the rim has different strength properties in different directions, as is customary in the industrial art of constructing fibre reinforced polymer components. A person skilled in the art can select the direction of the fibres in the epoxy resin, depending on the desired strength profile, can also select combinations of different fibre directions as fibre reinforcement to suit and compliment the purpose of the component.

In a first embodiment the openings in the support element may be radially elongated openings or more preferably radially elongated indentations. Suitably such openings or indentations may protrude the support element entirely such that a connecting element, for example a bolt, may be fixed at its opposite end by means of for example a nut. The elongated opening may for example be an oval opening or a flat-sided oval opening or an opening manufactured by two or more bores just spaced away slightly. The small resulting edges which are left between those bores may be smoothed away afterwards. The opening may have one or two axis or axii of symmetry. Preferably the radially elongated holes in the support element are flat-sided ovals.

For this first embodiment it is preferred that the openings in the support element are radially extending indentations in the support element. These indentations preferably have a width which corresponds with the width of the connecting element or with the diameter, in case of a cylindrical, connecting element. The design of the indentations may vary and may for example be slots or half ovals. The width of the edge may also be larger. In that case it is preferred to place an insert made of the same or a different material than the rim in the indentation. Such an insert which will act as a pressure dissipating element, will have an opening for allowing the connecting element to pass through the indentation and through the insert. Such as insert can also be easily replaced in case of wear or failure. This opening will suitably have a diameter corresponding with the diameter of the connecting element. This insert will encapsulate, in whole or partly, the connecting element as it passes the indentation and will in use transfer the pressure or load exercised by the rim on the connecting elements and vice versa in a more uniform manner. The insert may be a structural foam for example a polyurethane foam, which may be added when fabricating the wheel, may be an integral part of the supporting element or may be a prefabricated separate insert or bobbin. The insert may also be a decorative end nut which faces the outer side of the wheel. In case the insert is a separate element or part it may be made of various different materials, ranging from the earlier referred to polymers, to rubber and to metals.

In a second embodiment the radially elongated openings will be present in the edge and will allow for a connection element having suitably a circular cross-section to pass. The elongated opening may for example be an oval opening or a flat-sided oval opening or an opening manufactured by two or more bores just spaced away slightly. The small resulting edges which are left between the bores may be smoothed away afterwards. The opening may have one or two axis of symmetry. Preferably the radially elongated holes in the edge are flat-sided ovals. Because of the elongated opening some radial movement of the circular connection element is possible along the elongated radial direction of the opening. This movement of the connecting element in the opening will reduce the stress significantly when the support element expands due to thermal expansion while the rim does not expand or significantly less. In addition it will also alleviate the tightness of precision of the manufacturing tolerances of the pitch circle diameters of the mating components and of the holes themselves.

For this second embodiment it is preferred that the openings in the edge of the rim are indentations in the edge. These indentations preferably have a width which corresponds with the width of the connecting element or with the diameter, in case of a cylindrical, connecting element. The design of the indentations may vary and may for example be half ovals. The width of the edge may also be larger. In that case it is preferred to place an insert made of the same or a different material than the rim in the indentation. Such an insert which will act as a pressure dissipating element, will have an opening for allowing the connecting element to pass through the indentation and through the insert. Such as insert can also be easily replaced in case of wear or failure. This opening will suitably have a diameter corresponding with the diameter of the connecting element. This insert will encapsulate, in whole or partly, the connecting element as it passes the indentation and will in use transfer the pressure or load exercised by the rim on the connecting elements and vice versa in a more uniform manner. The insert may be a structural foam for example a polyurethane foam, which may be added when fabricating the wheel, may be an integral part of the supporting element or may be a pre-fabricated separate insert or bobbin. In case the insert is a separate element or part it may be made of various different materials, ranging from the earlier referred to polymers, to rubber and to metals.

The edge may comprise 3 or more indentations. The optimal number of indentations or radially elongated holes along the circular edge will depend on the radius of the wheel, its application and the loads applied. For a typical passenger vehicle wheel having a standard diameter, according to the international ETRTO norms, of between 10 inches and 35 inches the number of indentations is preferably between 10 and 100.

In case the openings in the edge are indentations according to the present invention it is preferred that the connecting element first runs through an opening as present in a securing member, then through the indentation in the edge of the rim and finally secured in the opening of the support element. The securing member covers at least partly the opening of the indentation as seen from the centre of the wheel along the radial. The securing member may actually consist of several pieces of a flat strip, plate, ring or an L-shaped profile with an opening in one of its legs, or it can indeed be a fully circular ring or profile following the inner circumferential edge of the wheel rim. The leg of such an L-shape profiled ring which covers the opening may partly cover the opening or alternatively completely cover the opening. The axial extended leg part covering the opening may sit on or meet with the support element.

The securing member may be made of one continuous circular element or my be made up of several separate sections having openings or indentations along its circumference corresponding with the indentations in the edge and with the openings in the connecting member. Preferably the end of this circular member or sectional members covering the opening of the indentations has a surface aligned with a surface of the support element to provide additional support. Sectional members may be present along the entire circumference or along parts of the circumference. In case of a continuous circular element it has been found that the connecting elements may be partly present in the indentation when viewed in a radial direction. This allows a smaller radially extended edge. The holes in the circular securing member can also be radially elongated holes.

The rim may be comprised of two rim components, each component comprising a part of the edge along the circumferential end of each rim component. The use of two rim components is advantageous when the rim is comprised of a polymer and made by a moulding process utilising vacuum, pressure or both. By manufacturing the two rim components by means of a such a moulding process the need for complex moulds with multiple sections is avoided. These two separate "wheel rim halves" may also be made of different materials, for instance one in metal and one in a fibre reinforced polymer.

The rim and support element are connected by connecting elements. Examples of suitable connecting elements are fasteners, bolts, pins, dowels, clamps and bobbins or any of their combinations. Preferably the connecting element is a threaded bolt. The opening in the support element is then provided with a thread to receive the threaded bolt.

The invention will be illustrated by making use of the following figures.

FIG. 1 shows a vertical cross section of the wheel (1) according to the invention, perpendicular to the plane of the wheel. The wheel (1) is provided with a rim (2) for receiving a tire at its radially outer side (3) and provided with an edge (4) along the circumferential of the rim at its radially inner side (5). It is shown that a wheel hub (6) is connected to the rim (2) via a support element (7). The material of the rim (2) and the support element (7) are different. The support element (7) is provided with openings (8) at its end (9) facing the rim (2) to receive a connecting element (10). The edge (4) of the rim (2) is provided with openings (11) in line with the openings (8) of the support element (7). The support element (7) is connected to the rim (2) via the connecting elements (10) present in the openings (11) in the edge (4) and in the openings (8) of the support element (7). The opening (11) in the edge (4) is a radial elongated opening (11) in FIG. 1.

Figure 2:
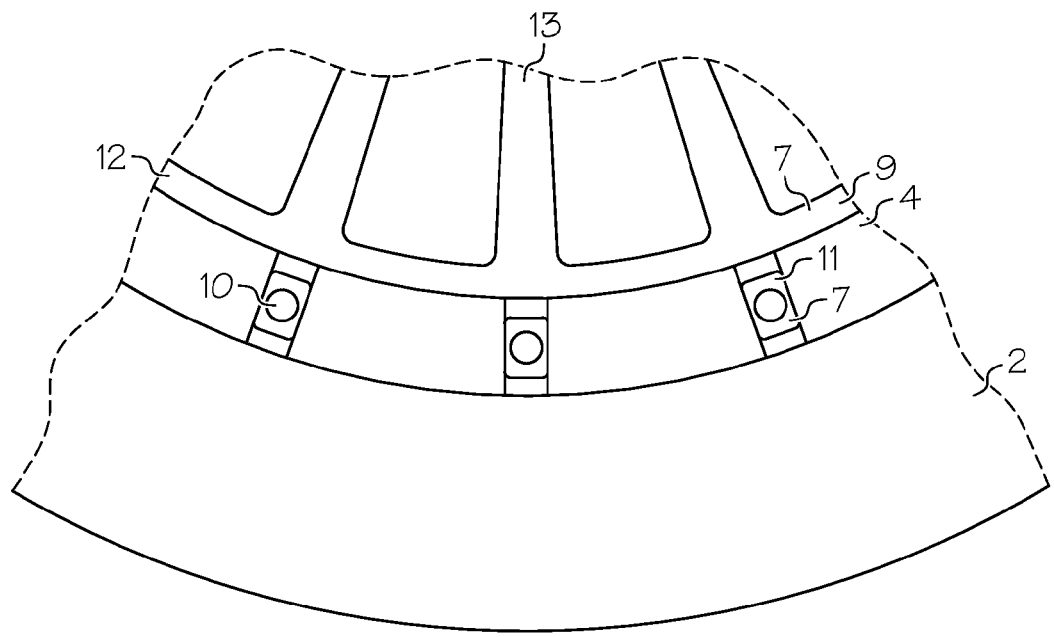

FIG. 2 is a cross-sectional view AA' of FIG. 1. FIG. 2 shows the edge (4) cut through. The edge (4) is provided with openings (11) which are radially elongated as shown. In this opening the cross-section of a threaded bolt (10) as the connecting member is seen. It is clear that the support element (7) which connects to the bolt (10) can move within the elongated opening (11) in a radial direction and thus also move relative to the rim (2) in a radial direction. This avoids excessive stresses when the support element (7) radially expands due to thermal expansion. FIG. 2 also shows part of the rim (2) as seen from the outer side (3), edge (4) and part of the support element (7). Support element (7) has a continuous ring part (12) at end (9) and spokes (13) radially extending from the ring part (12) to the wheel hub (6) (not shown). Each spoke (13) may correspond with one connection formed by connecting element (10), wherein the connecting elements are positioned radially outward from each spoke (13) as shown.

Figure 3:
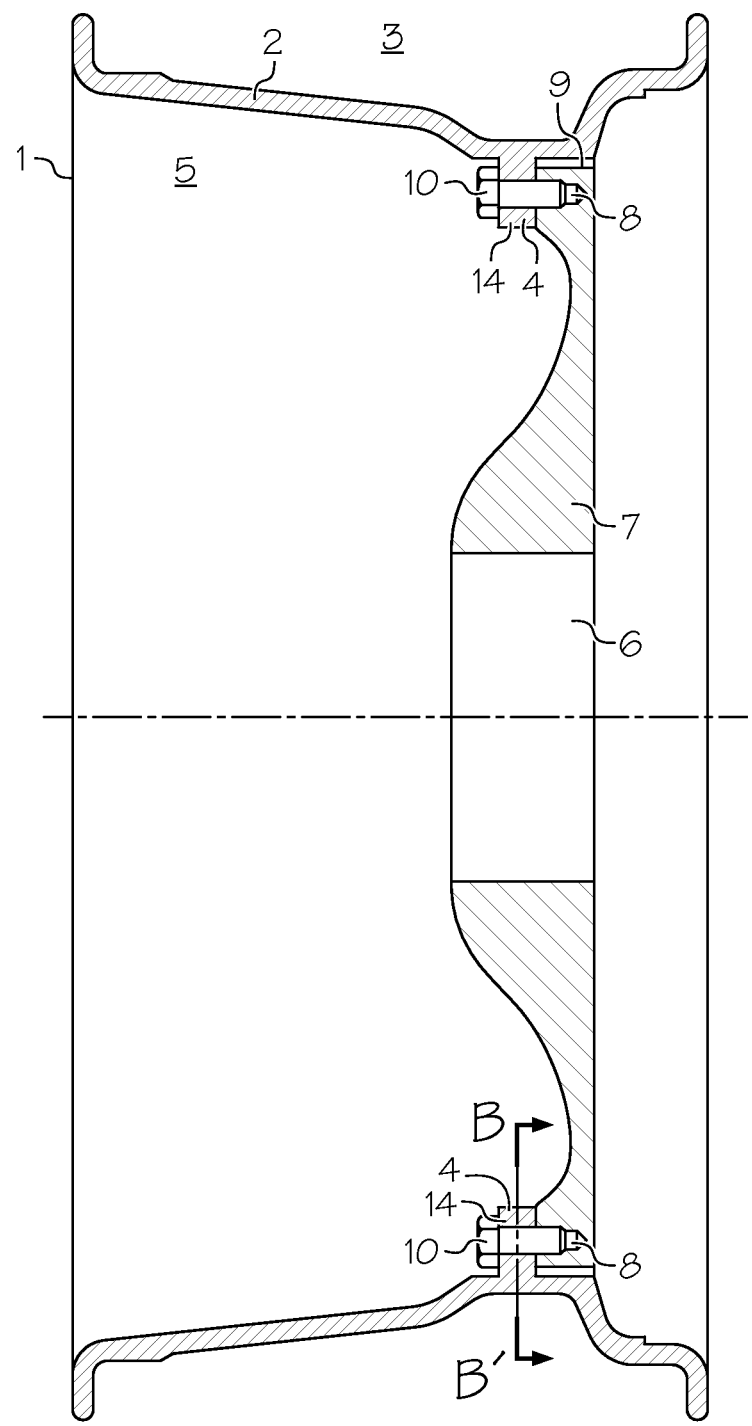

FIG. 3 shows a vertical cross section of the wheel (1) as in FIG. 1, wherein the opening in the edge is an indentation (14) in the edge (4).

Figure 4:
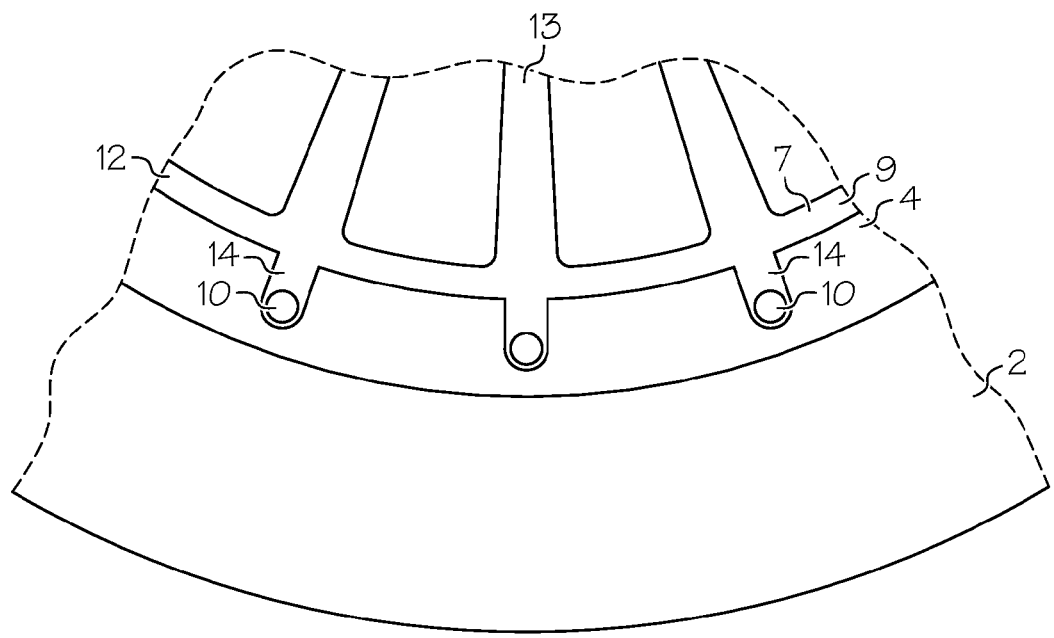

FIG. 4 is a cross-sectional view BB' of FIG. 2. FIG. 4 shows the edge (4) cut through. The edge (4) is provided with indentations (14) which extend radially into the edge (4) as shown. In this indentation (14) the cross-section of a threaded bolt (10) as the connecting member is seen. It is clear that the support element (7) which connects to the bolt (10) can move within the indentation (14) in a radial direction and thus also move relative to the rim (2) in a radial direction. This avoids excessive stresses when the support element (7) radially expands due to thermal expansion. FIG. 4 also shows part of the rim (2) as seen from the outer side (3), edge (4) and part of the support element (7). Support element (7) has a continuous ring part (12) at end (9) and spokes (13) radially extending from the ring part (12) to the wheel hub (6) (not shown). Each spoke (13) may correspond with one connection formed by connecting element (10), wherein the connecting elements are positioned radially outward from each spoke (13) as shown.

Figure 5:
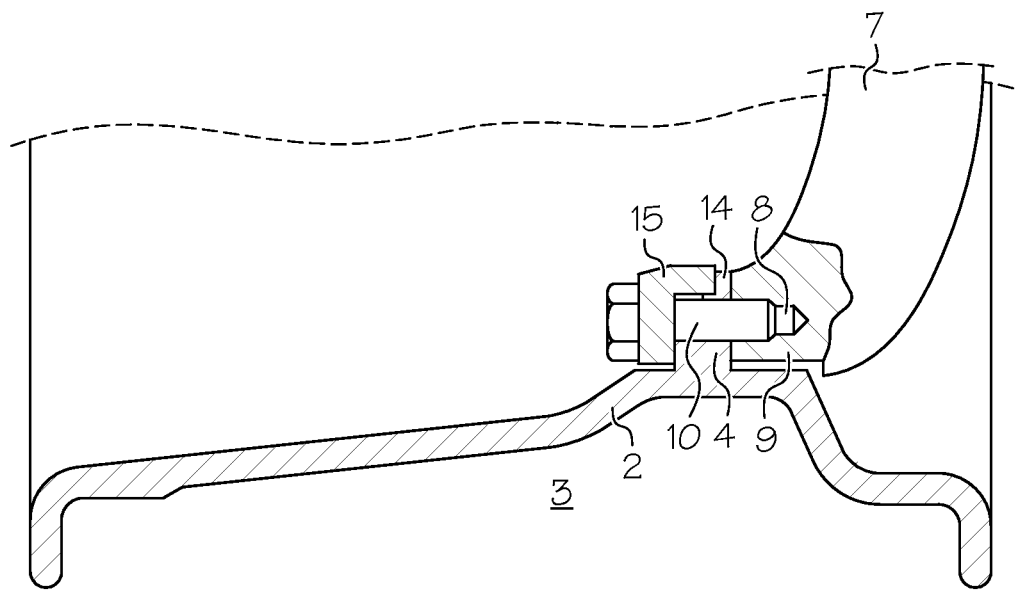

FIG. 5 shows a rim (2) connected to a support element (7) at its end (9) by means of a threaded bolt (10) fixed in opening (8). FIG. 5 shows an embodiment wherein the opening in the edge (4) is an indentation (14). The connecting member (10) is secured by a L-shaped strip (15) as the securing member. The L-shaped strip (15) has an opening in one leg for the connecting member (10) and covers with its other leg partly the indentation (14) as seen from the radially inner side (5). As shown the securing member is fitted into the indentation to firmly lock the drive of the rim (2) with respect to the supporting element (7) when accelerating or decelerating.

Figure 6:
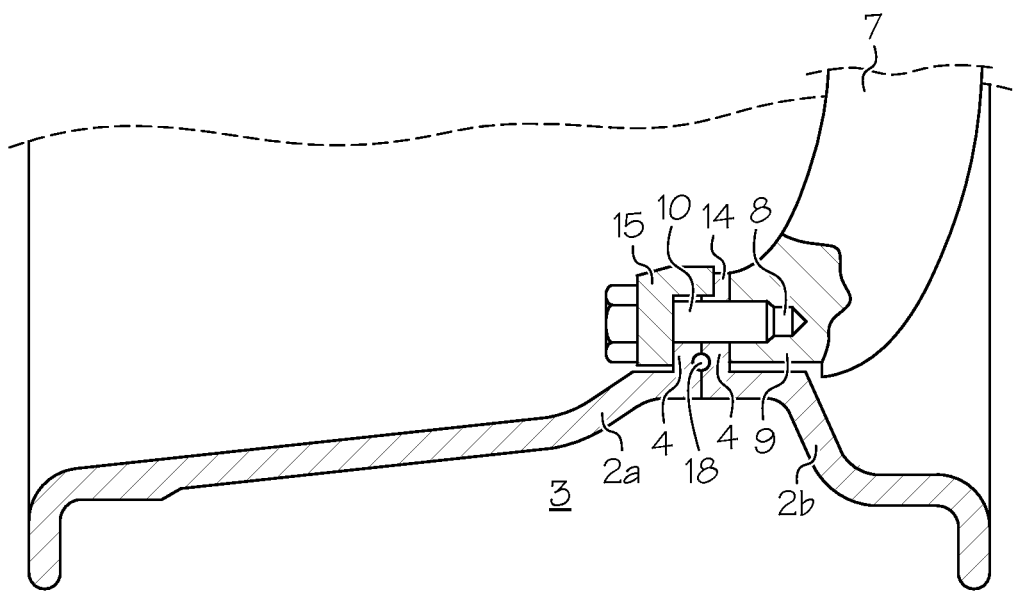

FIG. 6 is similar to FIG. 5 except in that the rim is composed of two rim components (2a, 2b), each component comprising a part of the edge (4) along the circumferential end of each rim component (2a, 2b). A sealing ring (18) is provided between components (2a, 2b) to achieve a gas tight connection. The two parts are held together via connecting element (10) as shown.

Figure 7:
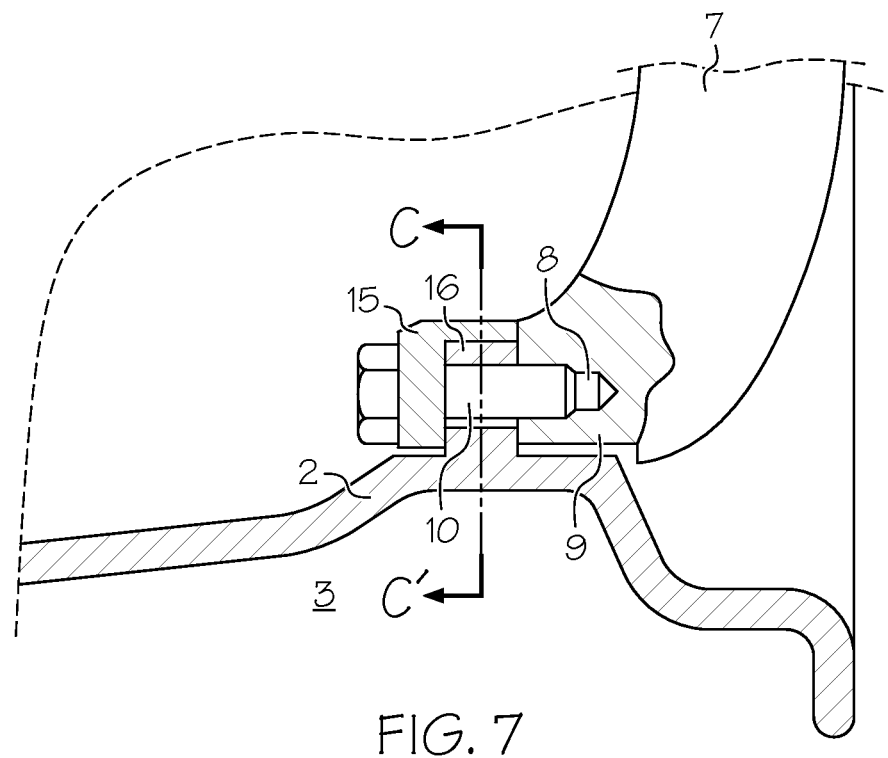

FIG. 7 is similar to FIG. 5 except in that the leg of the L-shaped securing member (15) covering the indentation extends to the end (9) of support element (7). Also a pressure dissipating element (16) is present in the space formed by indentation (14), securing member (15) and edge (4).

Figure 8:
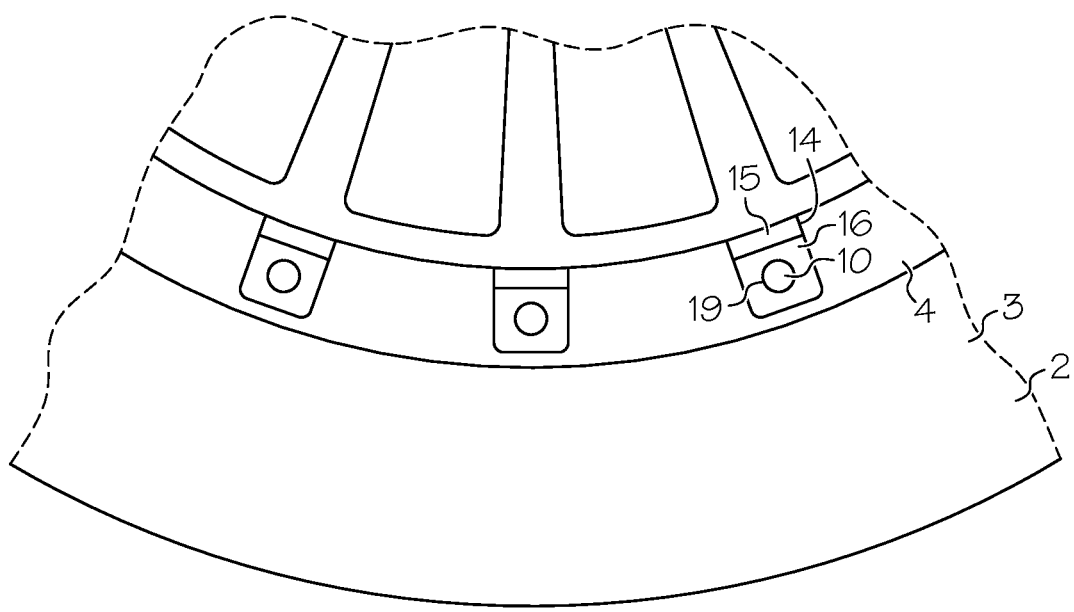

FIG. 8 shows the cross-sectional view CC' of FIG. 7 which shows that the pressure dissipating element (16) has an opening (19) for allowing the connecting element (10) to pass. The opening (19) has a diameter corresponding with the diameter of the connecting element (10). The pressure dissipating element (16) may alternatively be part of support element (7) or may be part of securing member (15).

Figure 9:
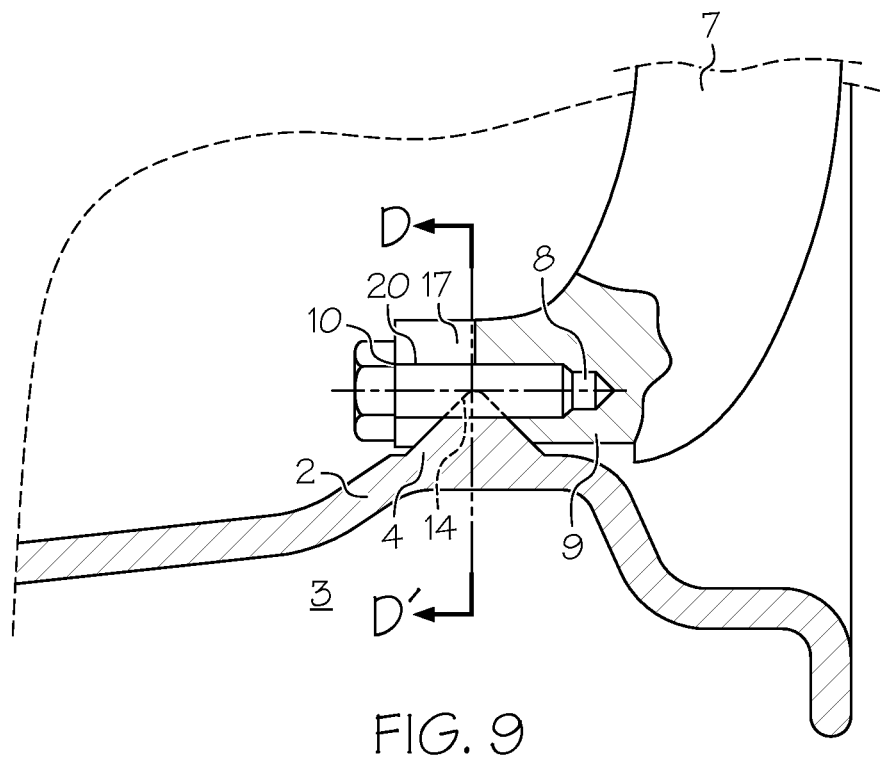

FIG. 9 shows an embodiment wherein the securing member is one continuous circular element (17) having openings (20) along its circumferential corresponding with the indentations (14) in the edge (4) and with the openings (8) in the support element (7). FIG. 9 also shows part of rim (2). The continuous element (17) may be made of several parts forming a circular shape in the final wheel.

Figure 10:
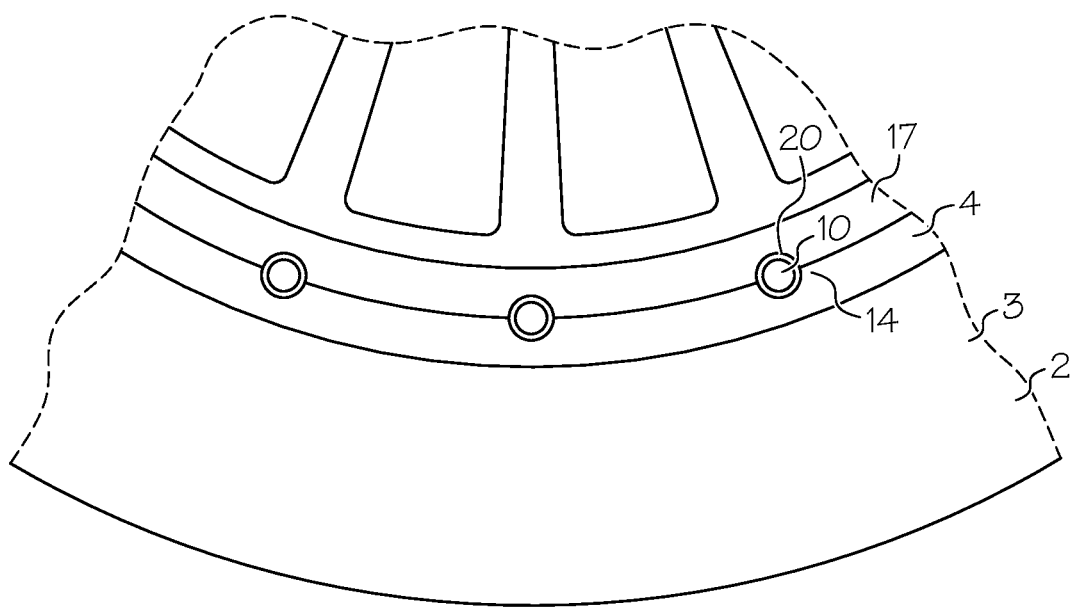

FIG. 10 shows the cross-sectional view DD' of FIG. 9. This figure shows part of the circular element (17) having openings (20). In this Figure it is shown that the connecting elements (10) are partly present in the indentation (14) when viewed in a radial direction.

Figure 11:
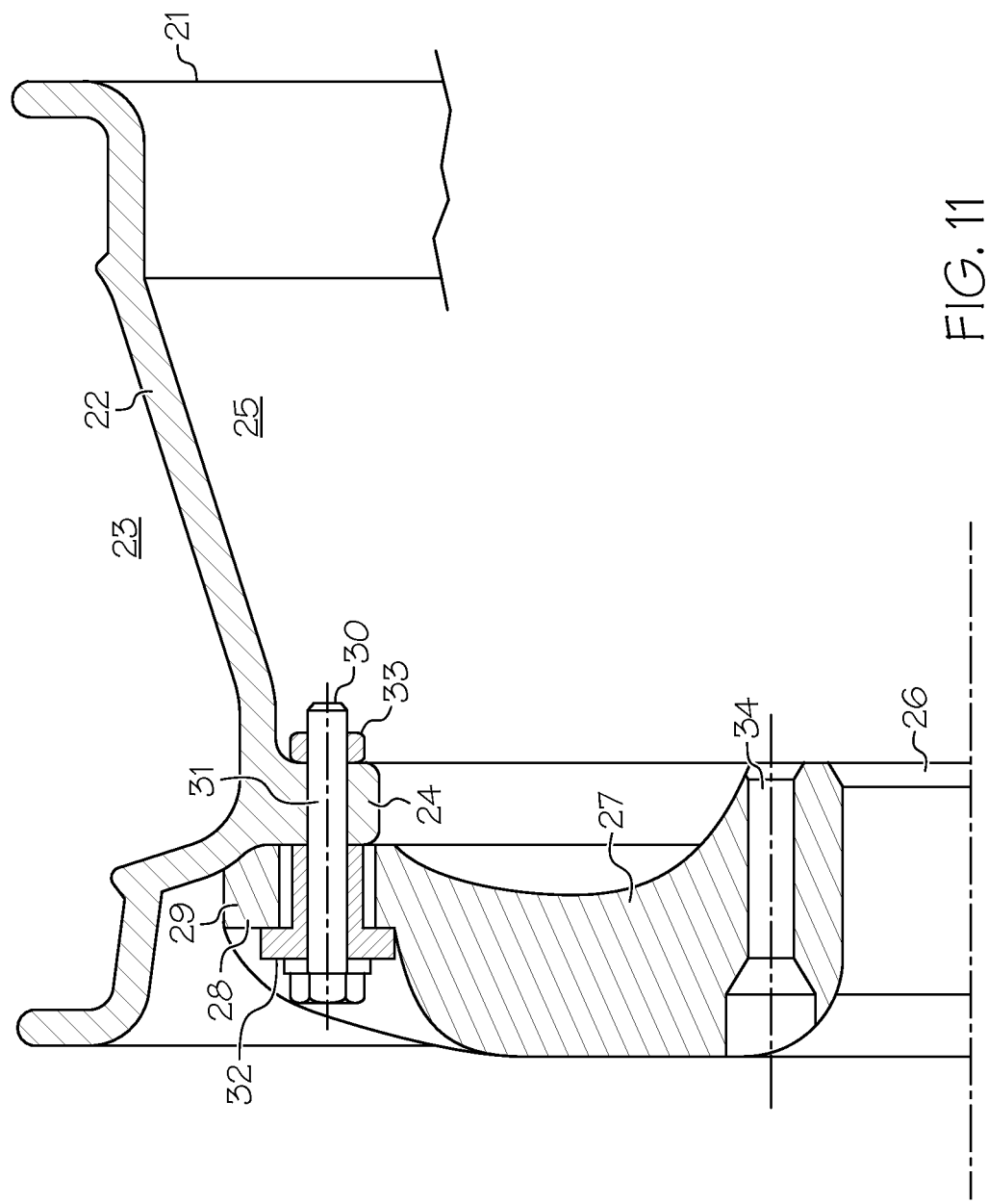

FIG. 11 shows a vertical cross section of the wheel according to the first embodiment wherein the openings in the support element are indentations in the support element. FIG. 1 shows a vertical cross section of the wheel (21) according to the invention, perpendicular to the plane of the wheel. The wheel (21) is provided with a rim (22) for receiving a tire at its radially outer side (23) and provided with an edge (24) along the circumferential of the rim at its radially inner side (25). It is shown that a wheel hub (26) is connected to the rim (22) via a support element (27). The material of the rim (22) and the support element (27) are different. The support element (27) is provided with indentations (28) at its end (29) facing the rim (22). The edge (24) of the rim (22) is provided with openings (31) in line with the indentations (28) of the support element (27). The support element (27) is connected to the rim (22) via a treaded bolt as the connecting elements (30) present in the openings (31) in the edge (24) and in the indentations (28) of the support element (27). The circular opening (31) in the edge (24) is just large enough to fit the bolt (31). A bobbin (32) is shown as a pressure dissipating element. The nut (33) is positioned at the inner side of the wheel (21) Also shown is an opening (34) for connecting members to connect the wheel to a vehicle and thus not visible when a car provided with these wheels is viewed from aside.

Figure 13:
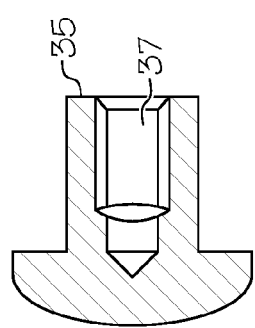
Figure 14:
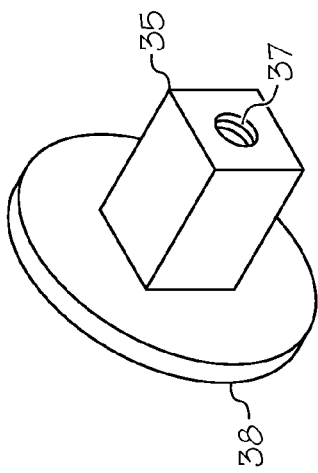
Figure 12:
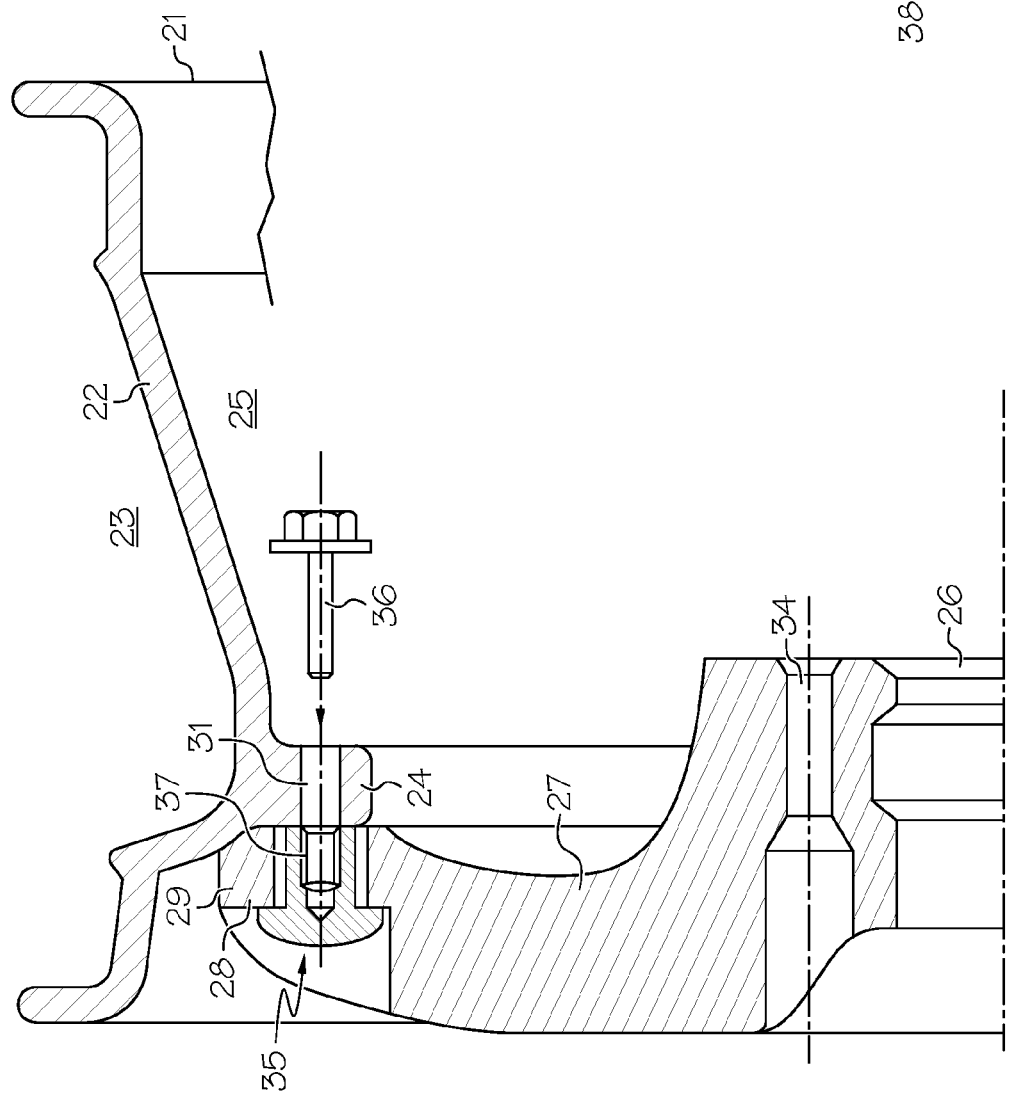
Figure 15:
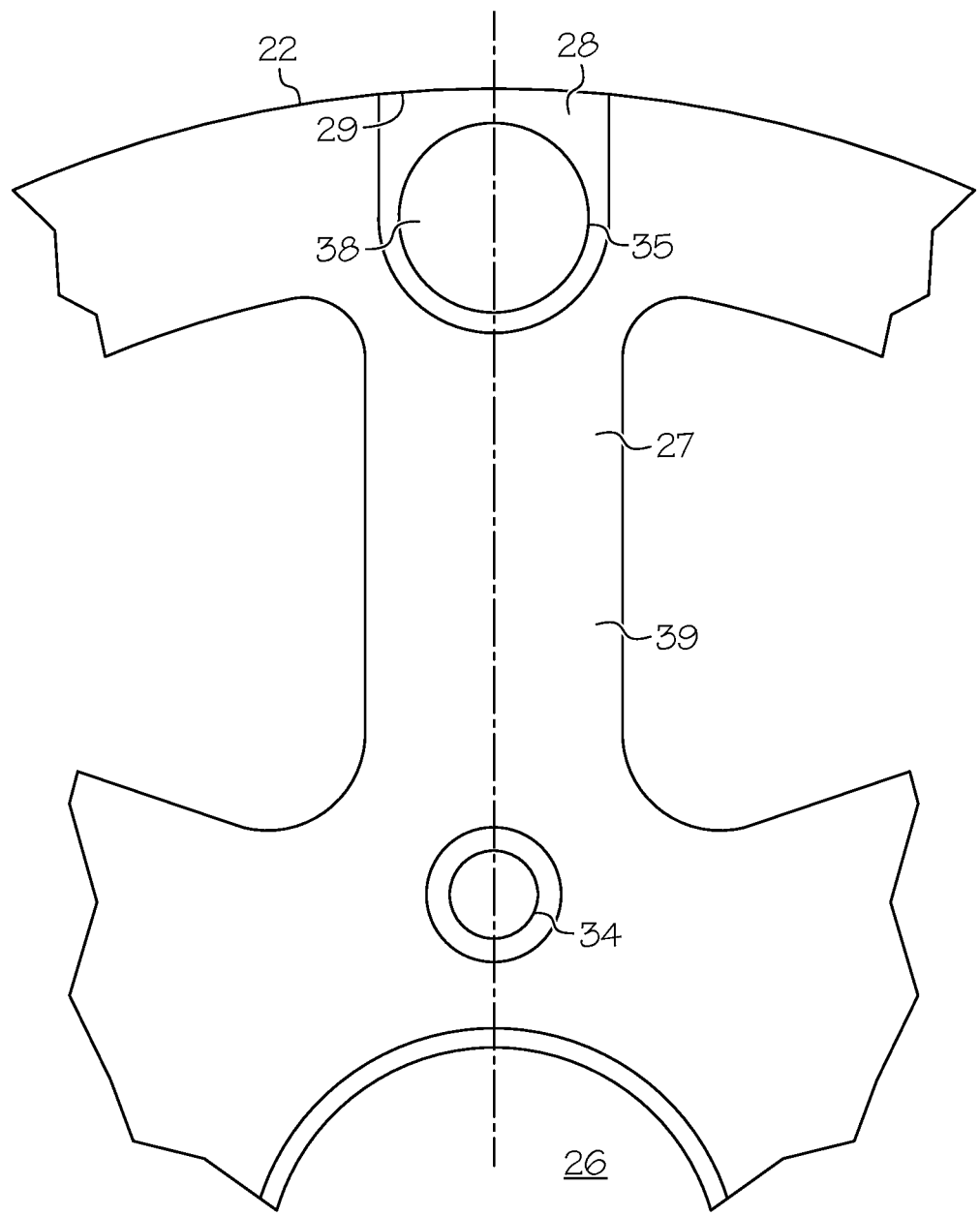

FIG. 12 shows a wheel similar to the wheel of FIG. 11 except in that a decorative end nut or bobbin (35) is present at one end of the connecting member at the indentation (28). The cross-sectional design of such a bobbin (35) may be square as shown in FIG. 15 and having dimensions equal to the width of the indentation (28). This ensures a tight connecting when threaded bolt (36) is fitted into the threaded opening (37). FIGS. 13 and 14 also show robbin (35). Use of a robbin (35) is advantageous because it hides the connecting member somewhat using circular end plate (38) which may be visually more attractive and it may ensure a more tight connection when a square design is used as explained above. The remaining numbers in FIG. 12 have the same meaning as in FIG. 11.

FIG. 15 shows the wheel (21) of FIG. 12 from aside. This Figure shows that each spoke (39) of support element (27) is provided with an indentation (28) at its radial end (29).

Figure 16:
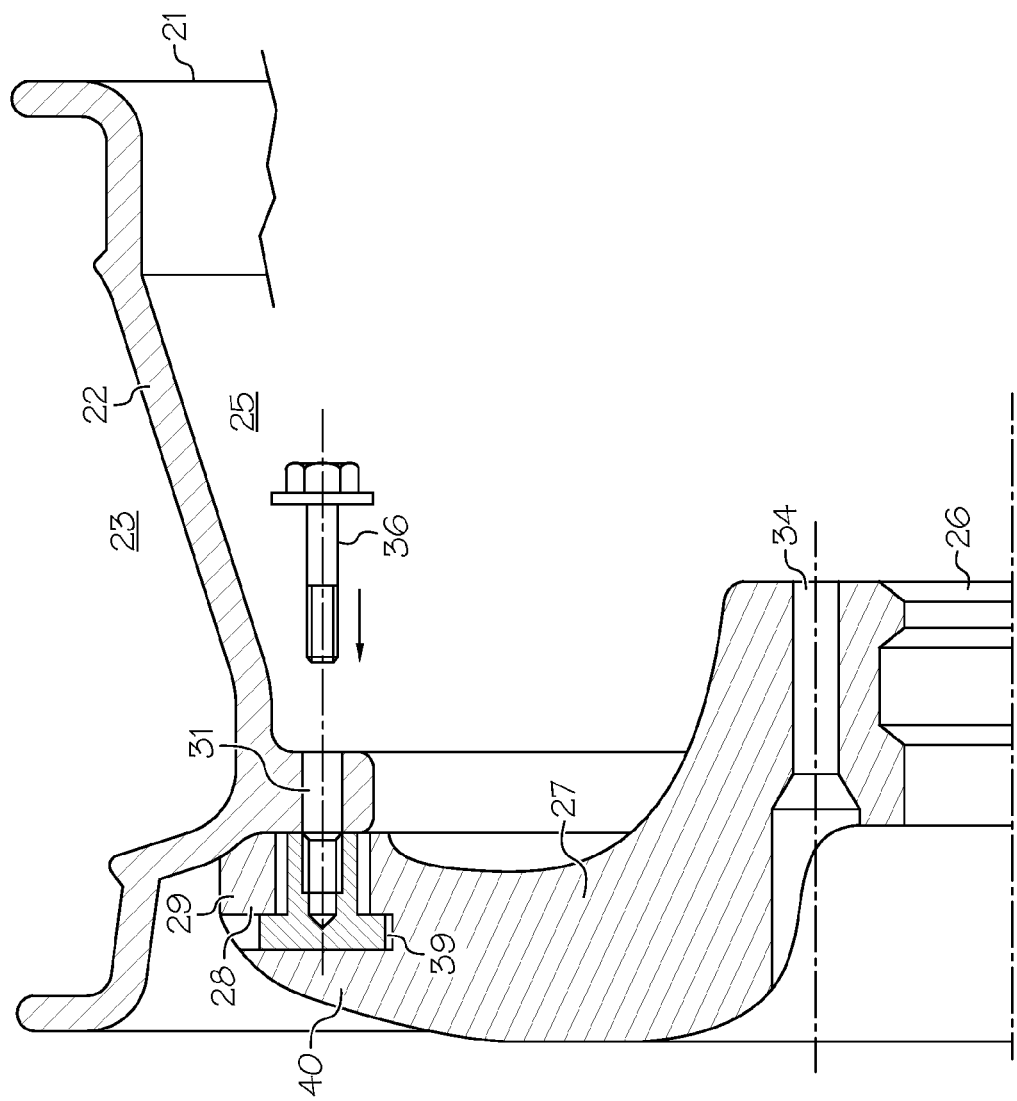

FIG. 16 shows a similar wheel as in FIG. 12 except in that the indentation (28) in support element (27) does not protrude the entire width of the end (29) of the support element as in the wheel of FIG. 12. Instead a rim (40) is present which hides the end plate (38) from being seen when the wheel is viewed from aside. The indentation (28) in FIG. 16 is of the slot type provided with a rectangular design to accommodate the rectangular part of the bobbin (35) and a slot (39) which can accommodate the circular end plate (38) of the bobbin (35). The remaining numbers in FIG. 16 have the same meaning as in FIG. 12. With a slot design is here meant that the indentation does not transverse the entire width of the radial end of the support element.

Figure 17:
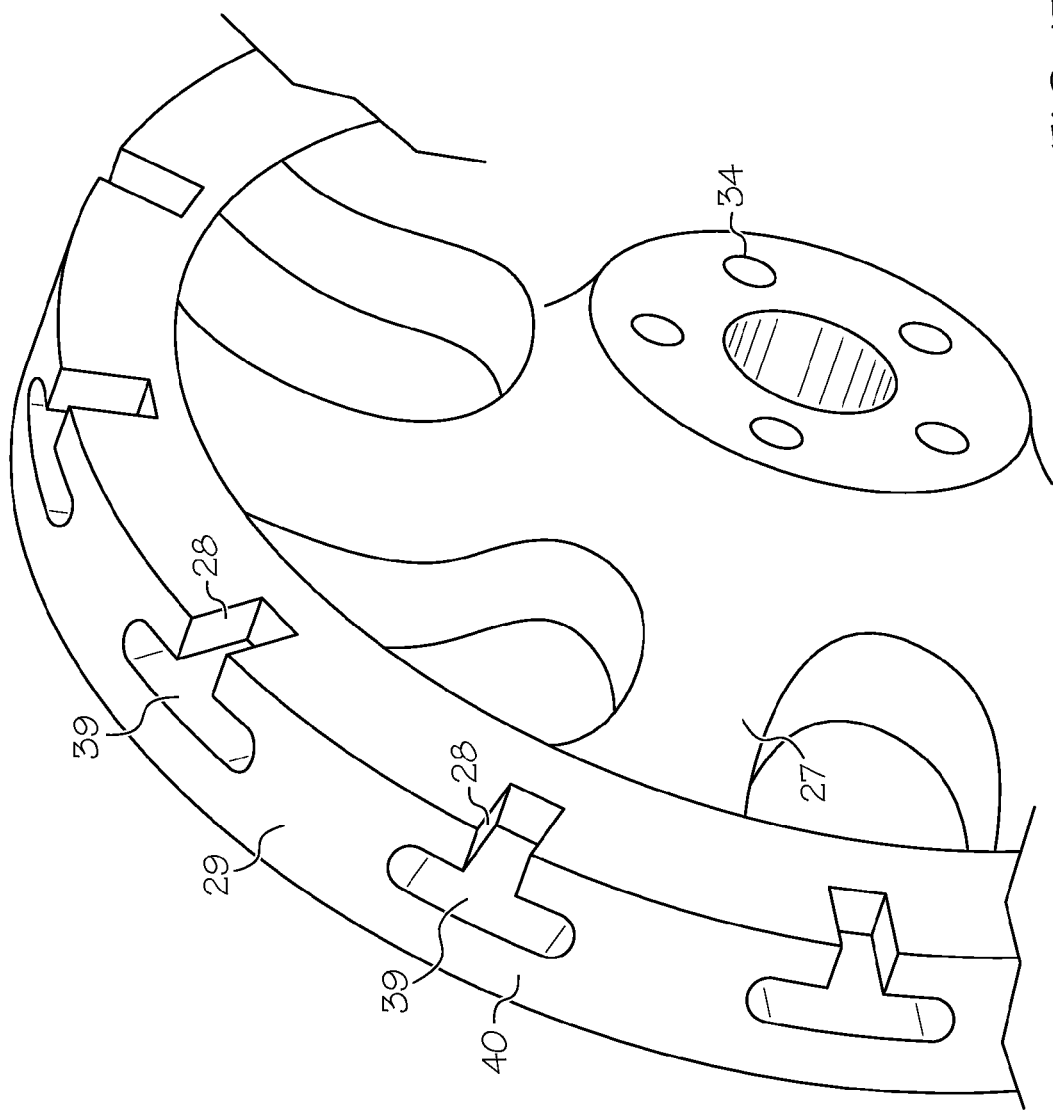

FIG. 17 shows a three dimensional presentation of part of the support element (27) of FIG. 16.

The invention claimed is:

1. A vehicle wheel comprising a rim for receiving a tire at its radially outer side and provided with an edge along the circumference of the rim at its radially inner side, a wheel hub connected to the rim via a support element, the support element provided with three or more openings at its end facing the rim to receive a connecting element, the edge of the rim provided with three or more openings corresponding with the openings of the support element and wherein the support element is connected to the rim via the connecting elements present in the openings in the edge and in the openings of the support element, wherein the openings in the edge are radially elongated indentations in the edge or the openings in the support element are radially elongated indentations and wherein the materials of the rim and of the support element are different and have a different thermal expansion.

2. Wheel according to claim 1, wherein the support element is comprised of metal and wherein the rim is comprised of a fibre reinforced polymer.

3. Wheel according to claim 2, wherein the fibre reinforced polymer is a carbon fibre reinforced polymer.

4. Wheel according to claim 1, wherein the openings in the edge are radially orientated indentations in the edge.

5. Wheel according to claim 4, wherein the connecting element first runs through an opening as present in a securing member, then through the radially orientated indentation in the edge and finally secured in the opening of the support element and wherein the securing member at least partly covers the opening of the radially orientated indentation as seen along the radial looking outward.

6. Wheel according to claim 5, wherein the securing member is made of one continuous circular element having openings or indentations along its circumference corresponding with the radially orientated indentations in the edge and with the openings in the connecting element.

7. Wheel according to claim 6, wherein the continuous circular securing member is an L-shaped profile ring which completely covers all indentations in the internal circumferential edge of the wheel rim and wherein the axial extending leg of the L-shaped profile ring sits on or meets with the support element.

8. Wheel according to claim 4, wherein a pressure dissipating element is present in the radially orientated indentation, the pressure dissipating element having an opening for allowing the connecting element to pass through the radially orientated indentation.

9. Wheel according to claim 4, wherein the openings in the support element are provided with a thread and wherein the connecting element is a threaded bolt.

10. Wheel according to claim 1, wherein the rim comprises two rim components, each component comprising a part of the edge along the circumference end of each rim component and where the two rim elements are made air tight by means of a seal or seals.

11. Wheel according to claim 1 wherein the radially orientated indentations are in the support element and the inner edge of the wheel rim has corresponding holes to receive the connecting members.

12. Wheel according to claim 1, wherein the number of radially orientated indentations in the edge is between 10 and 100.

\* \* \* \* \*